Figure 1:
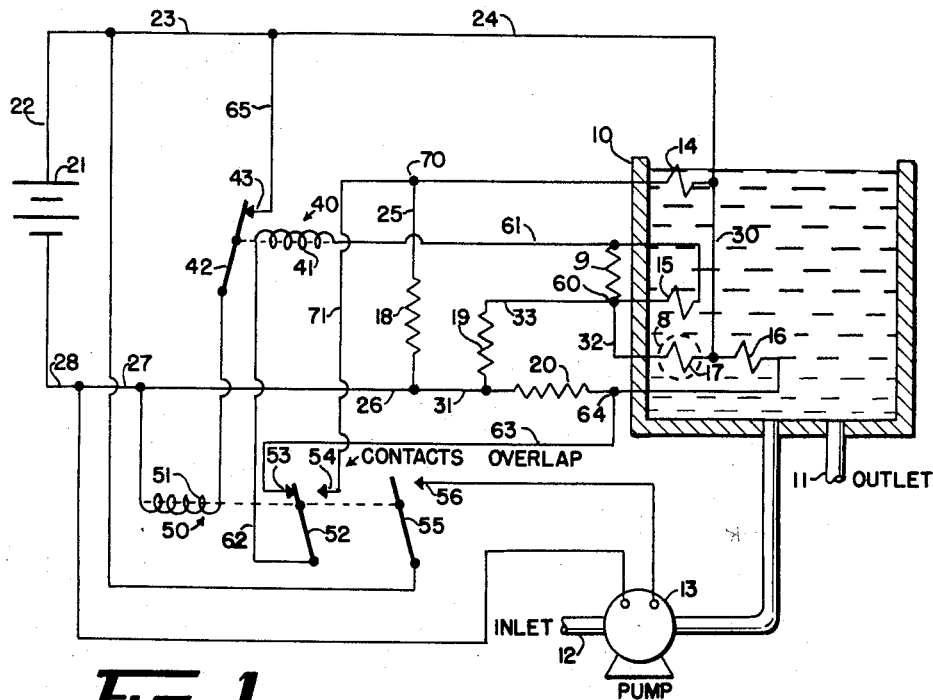

Feb. 9, 1960

W. R. WILSON 2,924,234

LEVEL SENSING APPARATUS

Filed Feb. 28, 1955

INVENTOR.
WILLIAM R. WILSON

BY *Frederick E. Lange*

ATTORNEY

United States Patent Office 2,924,234
Patented Feb. 9, 1960

2,924,234

LEVEL SENSING APPARATUS

William R. Wilson, St. Louis Park, Minn., assignor to Minneapolis-Honeywell Regulator Company, Minneapolis, Minn., a corporation of Delaware Application February 28, 1955, Serial No. 490,962

7 Claims. (Cl. 137—392)

This invention relates to level sensing apparatus utilizing temperature sensitive resistors and more particularly relates to liquid level sensing apparatus for sensing the level of liquid in a container and including means for controlling the level of liquid in the container between a first and a second level.

It is well known that a temperature sensitive resistor can be used to sense the presence or absence of a liquid since when such a resistor is connected in an electrical circuit the resistance and thereby the temperature thereof varies in accordance with the heat conducting quality of the medium to which the resistor is subjected. For example, air will conduct heat away from the negative temperature coefficient resistor in a slight amount compared to a fluid such as gasoline. Therefore, there is an abrupt change in resistance of the resistor when the resistor, previously in air, is subjected to a liquid.

The present invention utilizes this principle in a bridge type network havng two separate sensing portions and a common reference portion to form two bridge circuits, with the output of the bridge circuits controlling a detector having switching means operative to connect the detector selectively to one level sensing portion or the other depending upon the state of energization of the detector.

It is an object of the present invention to provide a first and a second temperature sensitive resistor arranged to be mounted at a first and a second level respectively in a liquid container, with the first and second resistors comprising the sensing portions of the first and the second bridge network, and having a detector including means controlled thereby to selectively connect the detector to the first or second bridge circuit depending upon the state of energization of the detector.

It is a further object of the present invention to provide a liquid level sensing apparatus having a first bridge circuit including a reference thermistor and a first sensing thermistor, a second bridge circuit including the common reference thermistor and a second sensing thermistor, a detector including a compensating thermistor, and means controlled by the detector to selectively connect the detector to the first or second bridge circuit depending upon the state of energization of the detector.

It is a further object of the present invention to provide a liquid level sensing apparatus including a fluid container, a first and a second thermistor to be positioned at a first and a second level in the container and connected in a first and a second bridge circuit respectively, which respective bridge circuits are unbalanced when the associated thermistors are subjected to fluid, and including a detector having switch means controlled thereby and operative to connect the detector in one or the other of the bridge circuits depending upon the state of energization of the detector.

Figure 2:
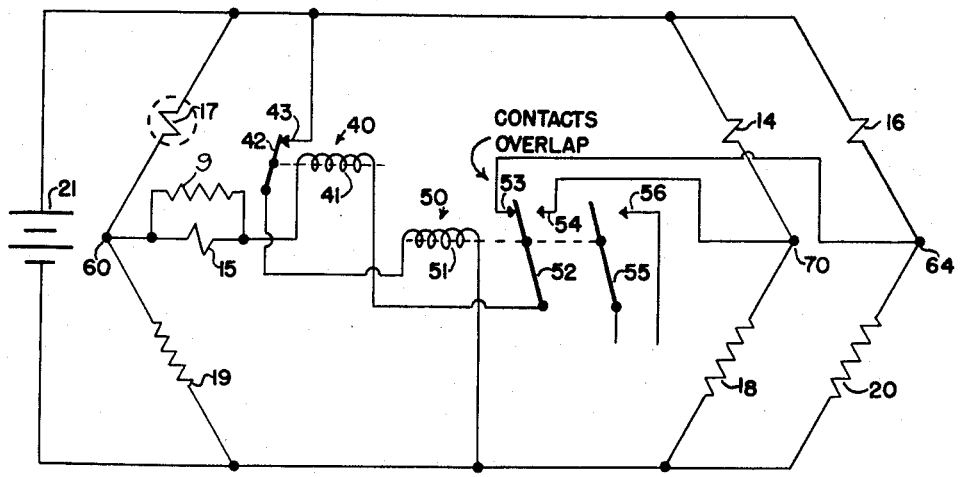

These and other objects of the present invention will become apparent to those skilled in the art upon reference to the specification, claims, and drawings of which:

Figure 1 is a schematic representation of the improved liquid level sensing apparatus associated with a liquid container, and Figure 2 is identical to Figure 1 wherein the circuit elements have been rearranged to resemble bridge circuits and wherein the tank and pump of Figure 1 have not been included.

The present invention utilizes temperature sensitive resistance means and more particularly, resistors which are temperature sensitive and have a negative temperature coefficient of resistance. That is, a resistance means which has a relatively high resistance when cold and whose resistance decreases as the temperature of the resistance means increases. A thermistor is a device of this type.

The resistance of a temperature sensitive resistor is controlled by the temperature of the means surrounding the resistor and by the rate at which the medium can conduct heat away from the resistor. If the resistor is shielded or insulated from direct contact with the medium, the resistance of the resistor is an indication of the ambient temperature of the medium. An unshielded temperature sensitive resistor can be used to determine if air or liquid surround the resistor. If air, or other gas, surrounds the resistors the temperature will be relatively high since the air does not readily conduct heat away from the resistor. However, if liquid surrounds the resistor the temperature of the resistor will be lowered since the liquid conducts heat away from the resistor to a greater extent.

These principles are utilized in the present invention. Referring to Figure 1, the reference numeral 10 designates a liquid or fluid container, which may be an aircraft fuel tank, having an outlet pipe 11 and an inlet pipe 12. The flow of fluid through the inlet of tank 10 is controlled by the energization of a pump 13. That is, fluid flows to the tank 10 when the pump 13 is energized. As an example, the tank 10 may be one of a plurality of fuel tanks of an aircraft wherein the outlet 11 directly supplies fuel to the engines of the aircraft while the pump 13 controls the pumping of fuel from the other of the plurality of tanks to the tank 10. In an installation such as this it is often desirable to control the level of fluid in the tank 10 between an upper and a lower limit. In other words, the pump 13 will be energized to cause the tank 10 to be filled to an upper level and when filled to this level the pump 13 will be deenergized. The level of fluid in the tank 10 will subsequently drop until a lower level is reached at which the pump will again be energized to refill the tank 10.

The apparatus for performing such a function includes a sensing thermistor 14 located at an upper level in the tank 10, a compensation thermistor 15 located at an intermediate level in the tank 10, a further sensing thermistor 16 located at a lower level in the tank, and a reference thermistor 17 located at a lower level in the tank. The sensing thermistors 14 and 16 and the reference thermistor 17 are of a small physical size, with a small heat dissipating surface, and are operated in a manner to ensure that they are self-heated above the surrounding ambient temperature, whether the thermistors be in air or in fuel, by the current passing through them. The compensation thermistor 15 has a sufficiently large heat dissipating surface to ensure that it will not be heated by the current passing through it, whether it be in air or fuel. The sensing thermistors 14 and 16 are directly subjected to the cooling properties of the medium surrounding the thermistors. The reference thermistor 17 is shielded by means of a shield, represented by the broken line 8. Therefore, the reference thermistor 17 is affected by the ambient temperature of the medium surrounding the thermistor but is not affected appreciably by the cooling effect of the medium surrounding this thermistor. In other words, while air and gasoline have greatly different heat conducting characteristics, the thermistor 17 will not respond to this difference in heat conducting characteristics but will respond to the ambient temperature of the air or gasoline to which it is subjected.

The sensing thermistors 14 and 16 are not shielded however and therefore the resistance of these thermistors will vary over wide limits depending upon whether or not they are in air or fuel. Since the compensating thermistor 15 is not self-heated, it will respond only to the temperature of the air or fuel surrounding it, and will not be cooled to a greater extent in fuel than it is in air, if both have the same ambient temperature. A resistor 9 is connected in shunt with thermistor 15 so that at low temperature conditions when the resistance of the thermistor is high sufficient current can flow through the combination.

The thermistors 14 through 17 are connected to resistors 18, 19, and 20 and to a source of voltage 21 to form a first and a second bridge circuit each having a sensing branch. One of the bridge circuit sensing branches can be seen by tracing a circuit from the upper terminal of the voltage source 21 through conductor 22, conductor 23, conductor 24, sensing thermistor 14, bridge output terminal 70, conductor 25, resistor 18, conductor 26, conductor 27, and conductor 28 to the lower terminal of voltage source 21.

A further bridge circuit sensing branch can be seen by tracing a circuit from the upper terminal of voltage source 21 through conductor 22, conductor 23, conductor 24, conductor 30, sensing thermistor 16, bridge output terminal 64, resistor 20, conductor 31, conductor 26, conductor 27, and conductor 28 to the lower terminal of voltage source 21.

The two above traced sensing branches have a common reference branch to complete the bridge circuits. This reference branch can be traced from the upper terminal of voltage source 21 through conductor 22, conductor 23, conductor 24, conductor 30, reference thermistor 17, conductor 32, bridge output terminal 60, conductor 33, resistor 19, conductor 31, conductor 26, conductor 27, and conductor 28 to the lower terminal of voltage source 21.

The above traced circuits can be seen more clearly in Figure 2 wherein the negative temperature coefficient resistors 14, 16 and 17 and the resistors 18, 19 and 20 have been rearranged to resemble the conventional bridge circuit. In Figure 2, one bridge circuit consists of reference thermistor 17, resistor 19, resistor 18, and sensing thermistor 14, with output terminals 60 and 70 and with the input terminals of the bridge connected to the voltage source 21. A further bridge circuit consists of the reference thermistor 17, resistor 19, resistor 20, and the sensing thermistor 16, with output terminals 60 and 64 and with the input terminals thereof connected to the voltage source 21.

The above described bridge circuits are constructed and have components of such a value that the bridge circuits are unbalanced when the associated sensing thermistor is in fuel and are balanced when the sensing thermistor is in air.

The detecting leg, or output of the bridge circuits, consists of a relay 40 having a winding 41, a movable switch blade 42, and a stationary contact 43. Relay 40 is shown in Figures 1 and 2 in the energized condition wherein the movable switch blade 42 engages contact 43. Upon deenergization of the relay winding 41, the movable switch blade 42 is biased by means, not shown, to disengage contact 43.

The movable switch blade 42 and stationary contact 43 of relay 40 control the energization of an auxiliary relay 50 having a winding 51, movable switch blades 52 and 55, and stationary contacts 53, 54 and 56. The contacts 53 and 54 are overlapping contacts. That is, the movable switch blade 52, which is shown in the energized condition in Figures 1 and 2, will first engage stationary contact 54 and will then disengage stationary contact 53 upon deenergization of the relay winding 51. Likewise, upon subsequent energization of relay winding 51 the movable switch blade 52 will engage stationary contact 53 and then subsequently disengage stationary contact 54.

The only function performed by the relay 40 is to cause energization of relay 50. Relay 50 in turn connects the winding 41 of relay 40 to either of the output terminals 64 or 70 of the bridge circuits, as will be described.

It will be noted that in each of the above described bridge circuits the circuit leg of the shielded reference thermistor 17 is directly connected to the circuit legs of the unshielded sensing thermistors 14 and 16. The parallel combination of unshielded compensating thermistor 15 and resistor 9 is connected to output terminal 60 and is in series with the winding 41 of relay 40, which winding is connected to one of the output terminals 64 or 70 of the bridge circuits in accordance with the position of switch blade 52 of relay 50, as will be described.

This circuit arrangement whereby a sensing thermistor and a reference thermistor are connected in adjacent legs of a bridge circuit has led to an operating difficulty when the thermistors are subjected to a relatively cold medium. For example, in relatively cold air, with the battery not connected the resistance of the sensing and reference thermistors are at a very high value. When the battery is connected, the reference and sensing thermistors may self-heat or warm up at different rates. The thermistor heating up first will decrease to a low resistance first and there is a tendency for this thermistor to short circuit the slower heating thermistor through the detection leg of the bridge including relay winding 41.

To prevent this effect the compensating thermistor 15 is placed in the detecting leg of the bridge, this structure being shown and claimed in the Donald C. Johnston Patent 2,824,278, which is assigned to the same assignee as the present inventions.

In the instant invention, the single compensating thermistor 15 is connected in series with relay winding 41 to the output terminal 60 to function as a compensator for both of the bridge circuits, depending upon the position of switch blade 52 of relay 50. The resistor 9 has a value so chosen that the parallel resistance is low enough to allow sufficient current to operate relay 40 at low temperature and still overcome the tendency for the faster heating thermistor to short circuit the slower heating thermistor.

The apparatus of Figure 1 has been shown with the tank 10 full. That is, both of the sensing thermistors 14 and 16 are subjected to the fuel in the tank. When this condition exists, relay 40 is energized since the bridge circuits are unbalanced. The unbalanced condition of the bridge circuits exist due to the fact that the sensing thermistors 14 and 16 are cooled by the fuel in the tank 10 whereas the reference thermistor 17 is subjected only to the ambient temperature of the fuel and thermistor 17 is not cooled due to the heat conducting properties of the fuel to the extent that the sensing thermistors 14 and 16 are cooled.

The energizing circuit for relay 40 can be traced from the output terminal 60 through compensating thermistor 15, conductor 61, relay winding 41, conductor 62, switch blade 52 and contact 53, and conductor 63 to output terminal 64. Here again, this circuit can be seen more clearly upon reference to Figure 2. From this circuit it can be seen that so long as the bridge circuit consisting of reference thermistor 17, resistor 19, resistor 20, and sensing thermistor 16 is unbalanced the relay 40 will remain energized.

With relay 40 energized, an energizing circuit is completed for relay 50. This energizing circuit can be traced from the upper terminal of power source 21 through conductor 22, conductor 23, conductor 65, contact 43 and movable switch blade 42, winding 51, conductor 27, and conductor 28 to the lower terminal of voltage source 21. So long as relay 50 is energized the circuit connecting the winding 41 of relay 40 between output terminals 60 and 64 will remain completed. Energization of relay 50 also causes the pump 13 to be deenergized since switch blade 55 is held out of engagement with contact 56.

The level of fuel in the tank 10 now drops to an intermediate level wherein the sensing thermistor 14 is no longer subjected to fuel. However, since the relay 50 is energized, this drop in fuel has no effect upon the apparatus other than to cause bridge 17, 19, 18 and 14 to be balanced. When the level of fuel reaches a point where the sensing thermistor 16 is no longer subjected to fuel, the bridge circuit consisting of the compensating thermistor 17, the resistor 19, the resistor 20, and the sensing thermistor 16 is balanced to cause the relay 40 to be deenergized. The deenergization of relay 40 also causes relay 50 to be deenergized. This is effective to cause movable switch blade 55 to engage contact 56 and energize pump 13 to start the filling cycle of the tank 10. Also, the deenergization of relay 50 causes movable switch blade 52 to first move into engagement with stationary contact 54 and then to disengage stationary contact 53. This connects relay 40 in the detecting leg or across the output terminals 60 and 70 of the bridge circuit consisting of the reference thermistor 17, resistor 19, resistor 18, and the sensing thermistor 14. This circuit can be seen by tracing a circuit from the output terminal 60 through compensating thermistor 15, conductor 61, winding 41, conductor 62, movable switch blade 52 and contact 54, and conductor 71 to output terminal 70.

As the level of fuel in tank 10 rises the thermistor 16 is first covered with fuel. This causes its bridge circuit to be unbalanced. However, since the relay 40 is deenergized and is connected to the other bridge circuit at this time the unbalance of the bridge circuit including thermistor 16 has no effect. The level of fuel within the tank 10 continues to rise until the point is reached wherein the sensing thermistor 14 is subjected to fuel. This causes the bridge circuit including the compensating thermistor 17, resistor 19, resistor 18, and the sensing thermistor 14 to be unbalanced to thereby energize relay 40.

Energization of relay 40 causes relay 50 to be energized. Relay 50, when energized, transfers the winding 41 of relay 40 from output terminal 70 to output terminal 64, restoring the apparatus to the condition shown in Figures 1 and 2. The overlapping contacts 53—54 of relay 50 are necessary to maintain circuit continuity and thereby energization of relay 40 during the process of transferring winding 41 of relay 40 from one bridge circuit to the other.

The apparatus will function in the condition shown in Figure 1 so long as fuel continues to cover the sensing thermistor 16. When the level of fuel in the tank 10 drops to where this thermistor is no longer covered, the pump 13 is again energized in the manner above described. From the above description it can be seen that an improved level sensing apparatus has been provided wherein the level of fluid in a container can be controlled between a first and a second level by means of an apparatus utilizing negative temperature coefficient resistors located at the first and second level and included in a first and a second bridge circuit having the detector which is selectively connected to the output of the first or second bridge circuit in accordance with the condition of energization of the detector.

Other modifications of the present invention will be apparent to those skilled in the art and it is intended that the scope of the present invention be limited solely by the appended claims.

I claim as my invention:
1. Liquid level sensing apparatus for use with a liquid container comprising; a source of voltage, a first and a second resistor connected in series to form a first junction, means connecting said series connected first and second resistor to said source of voltage, a first thermistor, a third resistor, said first thermistor and third resistor being connected in series to form a second junction, means connecting said series connected first thermistor and third resistor to said source of voltage, a second thermistor, a fourth resistor, said second thermistor and fourth resistor being connected in series to form a third junction, means connecting said series connected second thermistor and fourth resistor to said source of voltage, a relay having a winding and switch means, a compensating thermistor, means connecting one end of said winding in series with said compensating thermistor to said first junction, means controlled by said relay switch means selectively connecting the other end of said relay winding to said second or third junction in accordance with the condition of energization of said relay winding to provide an output indicative of whether said second or third junction is connected to said relay winding.

2. Fluid level sensing apparatus comprising: a fluid container, a first bridge circuit having a reference thermistor mounted in said container so as to be subjected to the ambient temperature of the fluid and having a first sensing thermistor mounted at a low level in said container to be subjected to the cooling effect of the fluid, a second bridge circuit including said reference thermistor and having a second sensing thermistor mounted at a high level in said container to be subjected to the cooling effect of the fluid, a detector for said first and second bridge circuits including switching means, said switching means operable in a first position to connect said detector to said second bridge circuit when said detector is de-energized and in a second position to connect said detector to said first bridge circuit when said detector is energized, and means controlled by said detector for controlling the level of fluid in said container.

3. Level sensing apparatus for use with a liquid container comprising in combination: a bridge network connected in series with a voltage source and having a first measuring branch including a first temperature sensitive resistor and a first output terminal, a second measuring branch including a second temperature sensitive resistor and a second output terminal and a reference branch including a third output terminal; voltage responsive means; and switch means controlled by said voltage responsive means to a first and second position, said switch means being operative in the first position to connect said voltage responsive means between the first and third terminals; and in the second position to connect said voltage responsive means between second and third terminals.

4. Liquid level sensing apparatus for use with a liquid container comprising, in combination: a first and a second sensing thermistor; a reference thermistor; a source of voltage; a first bridge circuit having a sensing branch including the first sensing thermistor, a reference branch including the reference thermistor, a pair of input terminals and a pair of output terminals; a second bridge circuit having a sensing branch including the second sensing thermistor, a pair of input terminals and a pair of output terminals, one of which output terminals is in said reference branch; means connecting the input terminals of said first and second bridge circuits to said source of voltage; a detecting circuit means including voltage responsive means selectively connected to the output terminals of said first or second bridge circuit; switch means operative to first and second positions by said voltage responsive means; conductor means including said switch means in the first position connecting said detecting circuit means across the output terminals of said first bridge circuit; and conductor means including said switch means in the second position connecting said detecting circuit means across the output terminals of said second bridge circuit.

5. Apparatus of the class described comprising, in combination: a first series circuit including a first sensing thermistor connected in series with a first resistor, the connection forming a first junction point; a second series circuit including a second sensing thermistor connected in series with a second resistor, the connection forming a second junction point, a third series circuit including a third resistor connected in series with a fourth resistor, the connection forming a third junction point; means connecting said first, second and third series circuits in parallel; a source of voltage; means connecting the parallel connected series circuits in series with said source of voltage; a first relay winding having first and second terminals; means connecting the first terminal of said first relay winding to the third junction point; a first switch operable to a first position by said first relay when energized; a second relay winding; means including said first switch in the first position connecting said second relay winding in series with said source of voltage; a second switch operable to a first position by said second relay winding when energized and to a second position when de-energized; means including said second switch in the first position connecting the second terminal of said first relay winding to said first junction point; and means including said second switch in the second position connecting the second terminal of said first relay winding to said second junction point.

6. Liquid level sensing bridge network apparatus for use with a liquid container comprising: a source of voltage; a first bridge including a first and a second resistor connected in series to said source of voltage, and a first temperature sensitive resistor connected in series with a third resistor to said source of voltage; a second bridge including a second temperature sensitive resistor connected in series with a fourth resistor to said source of voltage, said first and second temperature sensitive resistors having a heat dissipation rate in liquid different from that in air; voltage responsive means responsive to conditions of balance and unbalance of said bridges having a first terminal connected to the connection of said first and second resistors and a second terminal; and switch means operable to a first and a second position by said voltage responsive means, said switch means in the first position connecting the second terminal to the connection of said first temperature sensitive resistor and said third resistor and in the second position connecting the second terminal to the connection of said second temperature sensitive resistor and said fourth resistor in accordance with the condition of balance or unbalance of said bridges to provide an output indicative of the condition of balance or unbalance of said bridges.

7. Liquid level sensing apparatus comprising: a liquid container; a source of voltage; a first bridge circuit having an output and having a pair of input terminals connected to said source of voltage and having a first negative temperature coefficient resistor mounted at a first level in said container, said first bridge circuit being unbalanced when the level of liquid in said container is such that said first negative temperature coefficient resistor is subjected to the liquid's cooling effects; a second bridge circuit having an output and having a pair of input terminals connected to said source of voltage and having a second negative temperature coefficient resistor mounted at a second level in said container, said second bridge circuit being unbalanced when the level of liquid in said container is such that said second negative temperature coefficient resistor is subjected to the liquid's cooling effects; voltage responsive means selectively connected to the output of the first or second bridge circuit; and switch means controlled by said voltage responsive means, connecting said voltage responsive means, when energized, to the output of said first bridge circuit and when deenergized to the output of said second bridge circuit.

References Cited in the file of this patent

UNITED STATES PATENTS

| | | |
|---|---|---|
| 1,346,898 | Kingsbury | July 20, 1920 |
| 2,211,606 | Pratt | Aug. 13, 1940 |
| 2,483,450 | Wolfner | Oct. 4, 1949 |
| 2,580,016 | Gilbert | Dec. 25, 1951 |
| 2,655,933 | Odell | Oct. 20, 1953 |
| 2,667,178 | Fred et al. | Jan. 26, 1954 |
| 2,824,278 | Johnston | Feb. 18, 1958 |